Feb. 24, 1931.        G. W. FORBES        1,794,008
SHOCK ABSORBING TOOL HANDLE
Filed May 2, 1928        2 Sheets-Sheet 2
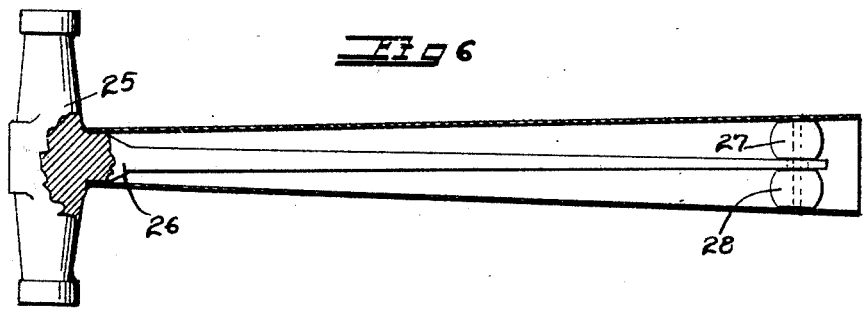
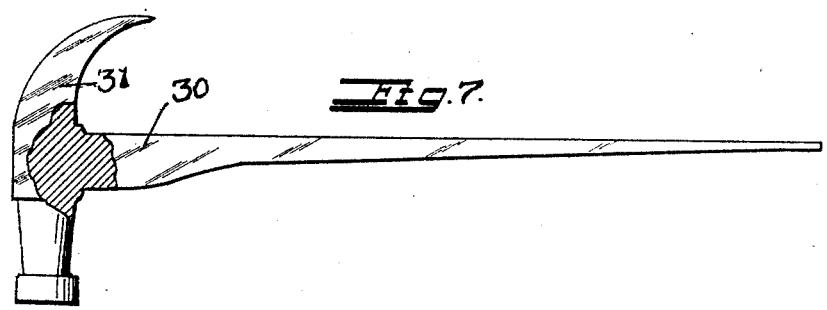
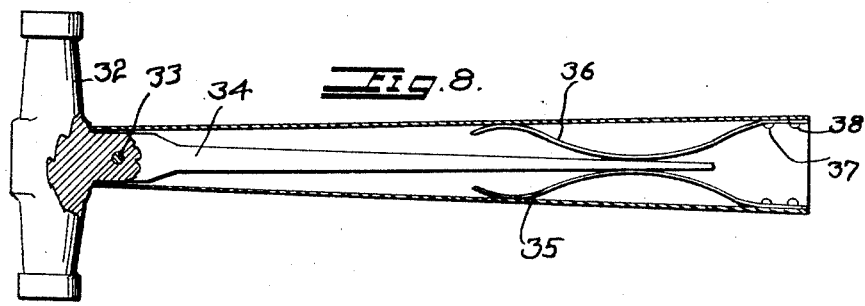
Inventor
George W. Forbes.
By Carlos P. Griffin
Attorney Patented Feb. 24, 1931

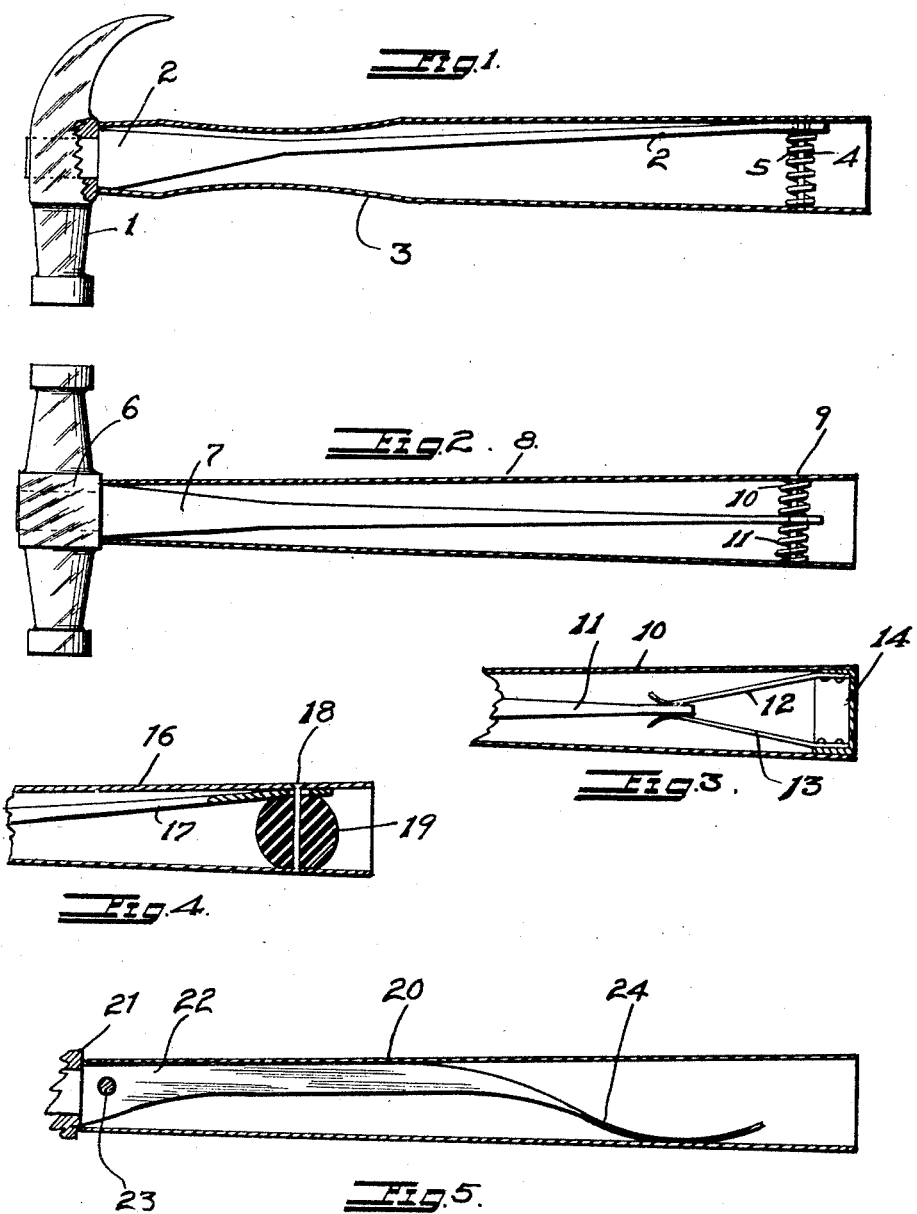

1,794,008

UNITED STATES PATENT OFFICE

GEORGE W. FORBES, OF SAN FRANCISCO, CALIFORNIA, ASSIGNOR OF ONE-HALF TO FRANCIS HERBERT DAM, OF SAN FRANCISCO, CALIFORNIA

SHOCK-ABSORBING TOOL HANDLE

Application filed May 2, 1928. Serial No. 274,581.

This invention relates to a spring handle striking tool, and its object is to provide a handle for a tool which will reduce the shock of the handle upon the hand and wrist of the user when the tool is struck against any object.

Another object of the invention is to provide a solid shank for a tool head thereby avoiding the common breakage of the tool handle where it enters the eye of the tool head. The connection of the tool head to the handle in this case is through a solid steel shank or through a shank integral with the tool head.

Another object of the invention is to provide a tool with a handle which will be sufficiently permanent and solid as to require replacement very seldom.

Another object of the invention is to provide means whereby there may be a slight movement in both directions with respect to the tool handle and the tool shank.

Another object of the invention is to provide a tool handle so constructed that the striking of the handle against nails or other objects will not break or injure the handle as is likely to happen with other handles.

Another object of the invention is to provide a tool handle so securely and permanently attached to the head of the tool that the handle will not become loose or fly off while in use.

Another object of the invention is to provide a tool handle which will give greater spring and resiliency to the handle than is found in any tool handle now in use, and thereby eliminate the strain upon the nerves of the user.

Another object of the invention is to provide a tool handle which will be serviceable and will stand up in any climate, hot or cold, wet or dry.

Another object of the invention is to provide a tool handle which will be of longer life than any tool handle now in use.

Another object of the invention is to provide a tool handle whose shank may be forged with the head or welded or brazed to the head of the tool itself, and thereby lessen the cost of construction of the tool as a whole.

The present tool handle consists of a hollow tube with a spring or cushion inserted therein and connected therewith; and its object is to provide such a handle for any striking tool or implement used by hand as will reduce or absorb the shock of the handle upon the hand, wrist or arm of the user when such tool or implement is struck against or applied to any object. By way of illustration, such handle may be employed with any kind of a hammer, hatchet, axe or striking implement. Its use, however, is not intended to be limited to the particular tools and implements just named but is to extend to any striking tool or implement whatever to which it may be usefully applied. Generally speaking, it may be called a shock absorbing tool handle.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a longitudinal sectional view of a claw hammer showing the interior construction designed to hold the head of the hammer together, Figure 2 is a longitudinal sectional view through the handle used for the operation of the double headed hammer, Figure 3 represents a longitudinal sectional view of the hammer handle adjacent the end, and illustrating a double spring for use with the hammer, similar to the double striking hammer shown in Figure 2, Figure 4 is a longitudinal sectional view through the hammer handle showing a rubber ball used for giving the necessary resiliency to the hammer shank, Figure 5 is a longitudinal sectional view through the hammer handle showing a single spring loosely bearing upon the inside of the handle for supporting the hammer head resiliently in connection therewith, Figure 6 is a view of a hammer such as is shown in Figure 2 with two rubber balls for holding the hammer shank centrally positioned within the hollow handle, Figure 7 is a side elevation of a hammer and shank, a portion being shown in section adjacent the junction of the hammer and shank, Figure 8 is a modified form of the invention with the hammer handle shown in section and showing two oppositely placed flat springs for holding the hammer shank in a central position in the hollow handle.

In Figure 1 there is shown the ordinary carpenter's hammer head 1. This head may have a tapering metal shank 2 applied thereto and fastened therewith as may be desired. The shank extends into the hollow handle 3 to a point near the end of the gripping portion of the hammer.

The taper shank has a certain amount of resilience.

At this point there is a rivet 4 which extends through the hollow handle, and said rivet has a spring 5 surrounding it to hold the shank 2 against one side of the hollow handle. Any suitable cap may be used to close the end of the hollow handle, this forming no part of the present invention.

In Figure 2 the hammer head 6 is illustrated, said head having the shank 7 which extends into the hollow handle 8. The free end of the lever has a hole therein to receive the rivet 9 as well as two springs 10 and 11 which surround the rivet 9, and means for holding the shank 7 in a central position.

In the form of the invention shown in Figure 3 the hollow handle is indicated at 10, the hammer shank at 11 and the two springs for holding the hammer shank centrally positioned are illustrated at 12 and 13, said springs being fastened to the sides of the cap 14, which encloses the end of the handle.

In Figure 4 there is shown a hollow handle 16 with the hammer head shank extending thereinto as indicated at 17, said shank being held in place by means of the rivet 18, and the rubber ball 19 holds said shank resiliently against one side of the hollow handle.

In Figure 5 the hollow handle is indicated at 20, a portion of the hammer head at 21, the hammer shank at 22, and the pin connecting the shank handle at 23. The shank 22 is long enough so that when it gets down to the point marked 24, it is thin enough to act as a spring without an additional spring such as is shown in the other figures of the drawing.

It will also be understood that where a double hammer is to be used as shown in Figure 6 that the hammer head 25 may have the shank 26 integral therewith, and since the hammer head is to be struck against a solid object in both directions two small rubber balls 27 and 28 are used to hold the shank centrally placed with respect to the hammer handle to permit it to move with respect to the hammer head when the hammer is struck against a solid object.

In Figure 7 there is shown a view partly in section of one of the hammer heads, that is a hammer head similar to Figure 1, in which the shank 30 is integral with the hammer head 31. This hammer and shank may be used with any of the forms of hammer handle previously shown, and Figure 8 is a longitudinal sectional view in which the hammer 32 has the pin 33 for connecting the hammer handle. The shank 34 extends far enough from the hammer head to make it strong enough to act upon the two springs 35, 36. These two springs are riveted to the opposite ends of the handle as indicated at 37 and 38. In this form of the invention whenever the hammer is struck it will go in either direction with respect to the hollow handle, and is promptly restored to the initial position by the action of the spring itself.

Having thus described my invention, what I desire to secure by Letters Patent of the United States is as follows, but modifications may be made in carrying out the invention as shown in the drawings and in the above particularly described form thereof, within the purview of the annexed claims.

1. A tool comprising a head having a tapered shank integral therewith, a hollow handle pivoted to said head and enclosing said shank, a pair of flat springs having one of their ends, respectively, fixed to said handle on opposite sides of said shank with their intermediate portions bearing against said shank and their free ends respectively bearing against said handle.

2. A tool comprising a head having a shank tapering away from said head, a hollow handle enclosing said shank and tapering toward said head and snugly engaging said shank adjacent said head, means for holding said head and handle together, and resilient means interposed between the end of said shank and handle.

3. A tool comprising a head having a shank rigid with said head, a hollow handle enclosing said shank and snugly engaging on said shank adjacent said head, means for holding said head and handle together, and resilient means interposed between the end of said shank and handle.

In testimony whereof I have hereunto set my hand this 5th day of April, A. D. 1928.

GEORGE W. FORBES.